US009396596B2

(12) United States Patent
Park

(10) Patent No.: US 9,396,596 B2
(45) Date of Patent: Jul. 19, 2016

(54) SMARTKEY SYSTEM AND OPERATING METHOD THEREOF

(71) Applicant: HYUNDAI MOBIS Co., Ltd., Yongin-si (KR)

(72) Inventor: Yong Hee Park, Yongin-si (KR)

(73) Assignee: Hyundai Mobis Co., Ltd., Yongin-si (KR)

( * ) Notice: Subject to any disclaimer, the term of this patent is extended or adjusted under 35 U.S.C. 154(b) by 326 days.

(21) Appl. No.: 14/200,793

(22) Filed: Mar. 7, 2014

(65) Prior Publication Data

US 2014/0320262 A1 Oct. 30, 2014

(30) Foreign Application Priority Data

Apr. 30, 2013 (KR) ........................ 10-2013-0048081

(51) Int. Cl.
*G05B 19/00* (2006.01)
*G07C 9/00* (2006.01)

(52) U.S. Cl.
CPC ........ *G07C 9/00111* (2013.01); *G07C 9/00309* (2013.01); *G07C 2009/00793* (2013.01); *G07C 2209/63* (2013.01); *G07C 2209/65* (2013.01)

(58) Field of Classification Search
None
See application file for complete search history.

(56) References Cited

U.S. PATENT DOCUMENTS

| | | | | |
|---|---|---|---|---|
| 6,801,134 B1 * | 10/2004 | Juzswik | B60R 25/2072 | 307/10.2 |
| 2006/0071808 A1 * | 4/2006 | Nagata | B60R 25/2072 | 340/13.24 |
| 2006/0202798 A1 * | 9/2006 | Baumgartner | B60R 25/2072 | 340/5.61 |
| 2008/0174446 A1 * | 7/2008 | Ghabra | B60R 25/2072 | 340/13.2 |
| 2010/0191392 A1 * | 7/2010 | Juzswik | B60R 25/245 | 701/2 |
| 2012/0154114 A1 * | 6/2012 | Kawamura | B60R 25/245 | 340/5.63 |

* cited by examiner

*Primary Examiner* — Nay Tun
(74) *Attorney, Agent, or Firm* — NSIP Law

(57) ABSTRACT

Provided are a smartkey system and an operating method thereof. The smartkey system reflects an intensity of RF noise, which is detected in a zone having strong RF noise, in a fob indoor/outdoor position determination reference, and thus can prevent a determination error in which the presence of a fob is determined despite there being no fob registered in a vehicle, and prevent an operational reaction to a user's request from becoming slow.

16 Claims, 6 Drawing Sheets

SMARTKEY SYSTEM AND OPERATING METHOD THEREOF

CROSS-REFERENCE TO RELATED APPLICATIONS

This application claims priority under 35 U.S.C. §119 to Korean Patent Application No. 10-2013-0048081, filed on Apr. 30, 2013, the disclosure of which is incorporated herein by reference in its entirety.

TECHNICAL FIELD

The present invention relates to a smartkey system and an operating method thereof, and more particularly, to a smartkey system and an operating method thereof, which reduce errors of fob recognition.

BACKGROUND

A related art smartkey system expends much time in checking a position of a fob, and thus first checks the presence of the fob. Only when it is checked that there is the fob, the related art smartkey system checks the position of the fob.

For example, when two or more fobs are registered, the related art smartkey system expends too much time in checking all positions of the registered fobs. For this reason, a function of the related art smartkey system is manipulated by a user, and then after several seconds elapse, the manipulated function is performed.

As described above, the related art smartkey system confirms the presence of a fob and checks a position of the fob, and then, a user should wait for several seconds until an operation manipulated by the user is performed. In order to solve the user's inconvenience, a smartkey system first confirms the presence of a fob, and checks only a position of the confirmed fob, thereby enabling a function desired by the user to be quickly performed.

However, a vehicle stops at a place where radio frequency (RF) noise is severe, and when a door opening function or a vehicle starting function is requested by a user, due to the severe RF noise, the related art smartkey system abnormally determines there to be several fobs, and checks positions of the determined several fobs.

That is, despite there being no fob which is actually registered in a vehicle, when the related art smartkey system abnormally determines there to be a fob due to severe RF noise, the related art smartkey system checks a position of the determined fob. In addition, when the related art smartkey system abnormally determines there to be several fobs and checks all positions of the determined fobs, the related art smartkey system cannot immediately perform an operation requested by a user, and after several seconds elapse, the related art smartkey system performs the requested operation.

SUMMARY

Accordingly, the present invention provides a smartkey system and an operating method thereof, which reflect an intensity of RF noise, which is detected in a zone having strong RF noise, in a fob indoor/outdoor position determination reference, and thus can prevent a determination error in which the presence of a fob is determined despite there being no fob registered in a vehicle, and prevent an operational reaction to a user's request from becoming slow.

In one general aspect, a smartkey system includes: a fob; and a smartkey electronic control unit (SMK ECU) configured to measure a received signal strength indicator (RSSI) value of radio frequency (RF) noise received through an RF communication module when transmitting a presence check request signal to the fob, check whether the measured RSSI value of the RF noise is less than a presence determination reference value used to determine presence of the fob, measure an RSSI value of a response signal received from the fob in response to the presence check request signal when the measured RSSI value of the RF noise is less than the presence determination reference value as the check result, and determine there to be the fob registered in a vehicle when the measured RSSI value of the response signal is equal to or greater than the presence determination reference value.

In another general aspect, a method of operating a smartkey system includes: measuring a received signal strength indicator (RSSI) value of radio frequency (RF) noise received through an RF communication module when transmitting a presence check request signal to the fob; checking whether the measured RSSI value of the RF noise is less than a presence determination reference value used to determine presence of the fob; measuring an RSSI value of a response signal received from the fob in response to the presence check request signal when the measured RSSI value of the RF noise is less than the presence determination reference value as the check result; and determining there to be the fob registered in a vehicle when the measured RSSI value of the response signal is equal to or greater than the presence determination reference value.

Other features and aspects will be apparent from the following detailed description, the drawings, and the claims.

DETAILED DESCRIPTION OF EMBODIMENTS

Figure 1:
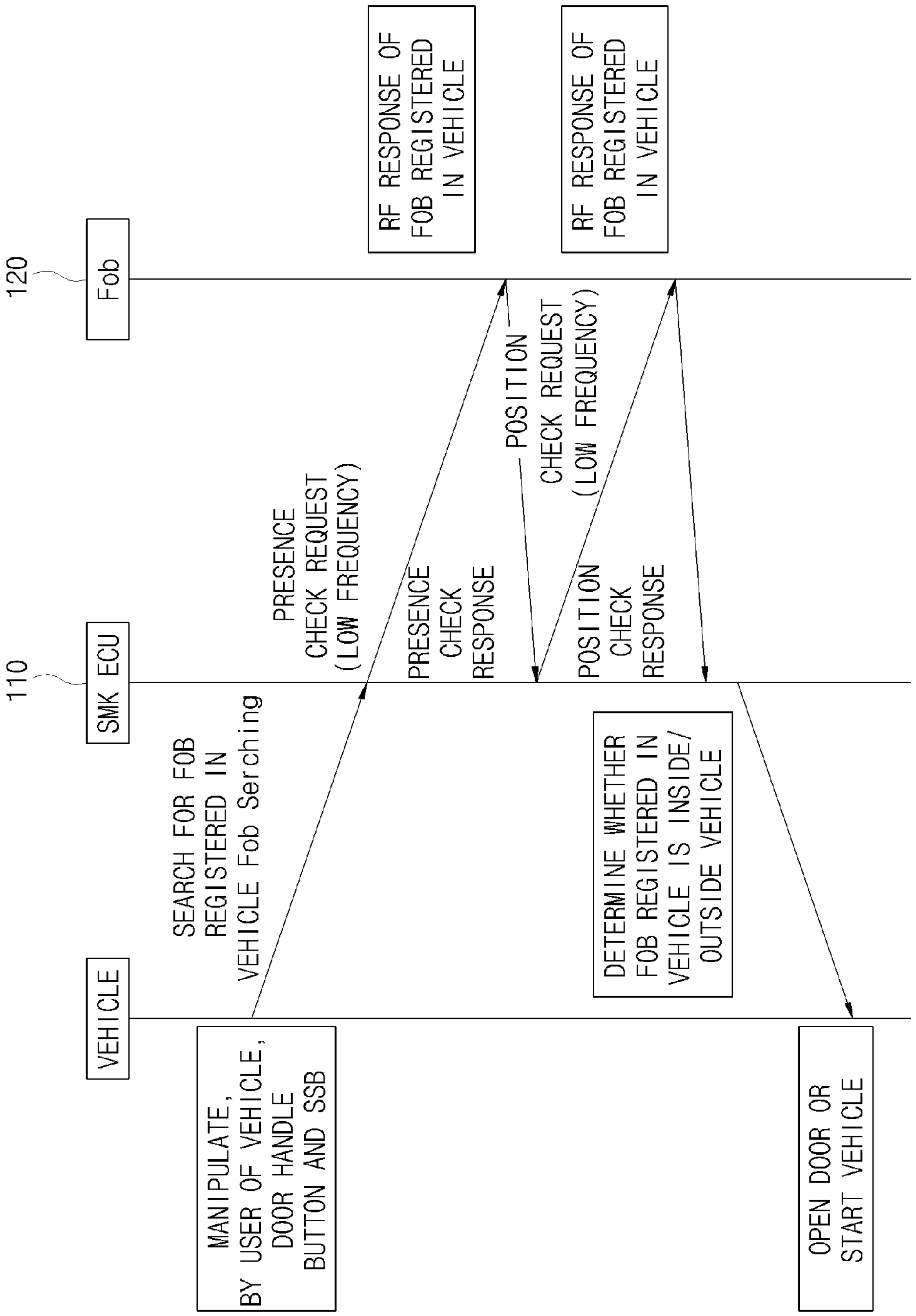
FIG. 1 is a diagram for describing a smartkey system according to an embodiment of the present invention.

A smartkey system includes: a fob; and a smartkey electronic control unit (SMK ECU) configured to measure a received signal strength indicator (RSSI) value of radio frequency (RF) noise received through an RF communication module when transmitting a presence check request signal to the fob, check whether the measured RSSI value of the RF noise is less than a presence determination reference value used to determine presence of the fob, measure an RSSI value of a response signal received from the fob in response to the presence check request signal when the measured RSSI value of the RF noise is less than the presence determination reference value as the check result, and determine there to be the fob registered in a vehicle when the measured RSSI value of the response signal is equal to or greater than the presence determination reference value.

When the measured RSSI value of the RF noise is equal to or greater than the presence determination reference value as the check result, the SMK ECU may store the measured RSSI value of the RF noise, measure an RSSI value of a response signal received from the fob, compare the stored RSSI value of the RF noise and the measured RSSI value of the response signal, and determine whether there is the fob according to the comparison result.

When the measured RSSI value of the response signal is less than the stored RSSI value of the RF noise as the comparison result, the SMK ECU may determine there to be no fob, and when the measured RSSI value of the response signal is equal to or greater than the stored RSSI value of the RF noise as the comparison result, the SMK ECU may determine there to be the fob.

When it is determined that there is the fob, the SMK ECU may transmit a position check request signal to the fob, and when a response signal is received from the fob in response to the position check request signal, the SMK ECU may determine whether the fob is inside or outside the vehicle, based on the received response signal.

When a door handle button or a start switch button is manipulated, the SMK ECU may transmit the presence check request signal to the fob. When it is determined that the fob is outside the vehicle, the SMK ECU may open a vehicle door. When it is determined that the fob is inside the vehicle, the SMK ECU may start the vehicle.

When it is determined that there is the fob, the SMK ECU may drive only a specific low frequency (LF) antenna that is designated among a plurality of LF antennas equipped in the vehicle, and when a position of the fob is checked, the SMK ECU may drive all the plurality of LF antennas equipped in the vehicle.

When the presence check request signal is transmitted and then a specific signal is received out of a predetermined response time in response to the presence check request signal, the SMK ECU may recognize the received specific signal as the RF noise, and when the specific signal is received within the predetermined response time in response to the presence check request signal, the SMK ECU may recognize the received specific signal as a response signal responding to the presence check request signal.

A method of operating a smartkey system includes: measuring a received signal strength indicator (RSSI) value of radio frequency (RF) noise received through an RF communication module when transmitting a presence check request signal to the fob; checking whether the measured RSSI value of the RF noise is less than a presence determination reference value used to determine presence of the fob; measuring an RSSI value of a response signal received from the fob in response to the presence check request signal when the measured RSSI value of the RF noise is less than the presence determination reference value as the check result; and determining there to be the fob registered in a vehicle when the measured RSSI value of the response signal is equal to or greater than the presence determination reference value.

The method may further include: when the measured RSSI value of the RF noise is equal to or greater than the presence determination reference value as the check result, storing the measured RSSI value of the RF noise, and measuring an RSSI value of a response signal received from the fob; and comparing the stored RSSI value of the RF noise and the measured RSSI value of the response signal to determine whether there is the fob according to the comparison result.

The determining of whether there is the fob may include: when the measured RSSI value of the response signal is less than the stored RSSI value of the RF noise as the comparison result, determining there to be no fob; and when the measured RSSI value of the response signal is equal to or greater than the stored RSSI value of the RF noise as the comparison result, determining there to be the fob.

The method may further include: when it is determined that there is the fob, transmitting a position check request signal to the fob; and when a response signal is received from the fob in response to the position check request signal, determining whether the fob is inside or outside the vehicle, based on the received response signal.

The measuring of an RSSI value of RF noise may include, when a door handle button or a start switch button is manipulated, transmitting the presence check request signal to the fob.

The measuring of an RSSI value of RF noise may include driving only a specific low frequency (LF) antenna that is designated among a plurality of LF antennas equipped in the vehicle.

The transmitting of a position check request signal may include driving all low frequency (LF) antennas equipped in the vehicle.

The measuring of an RSSI value of RF noise may include: determining whether a specific signal is received out of a predetermined response time in response to the presence check request signal after the presence check request signal is transmitted; and when it is determined that the specific signal is received out of the predetermined response time in response to the presence check request signal, recognizing the received specific signal as the RF noise.

The measuring of an RSSI value of a response signal may include, when it is determined that the specific signal is received within the predetermined response time in response to the presence check request signal, recognizing the received specific signal as a response signal responding to the presence check request signal.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
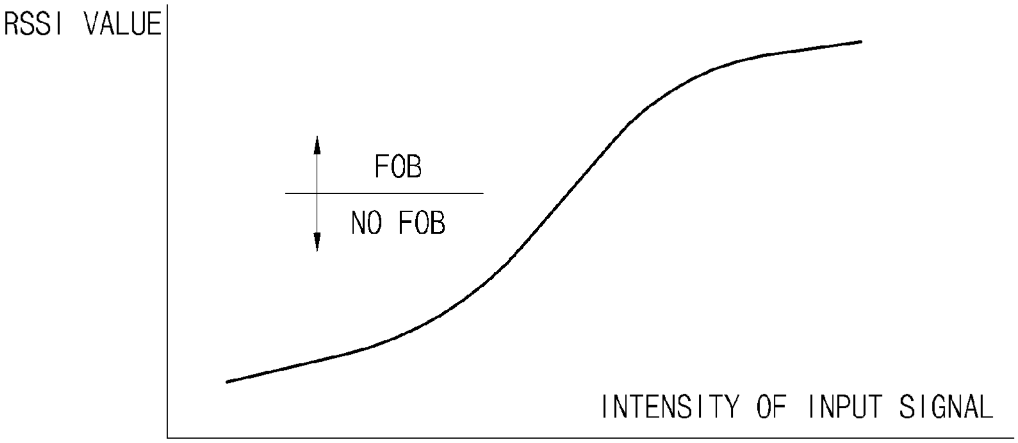
FIG. 2 is a diagram for describing a determination reference based on a measured received signal strength indicator (RSSI) value.
Figure 3:
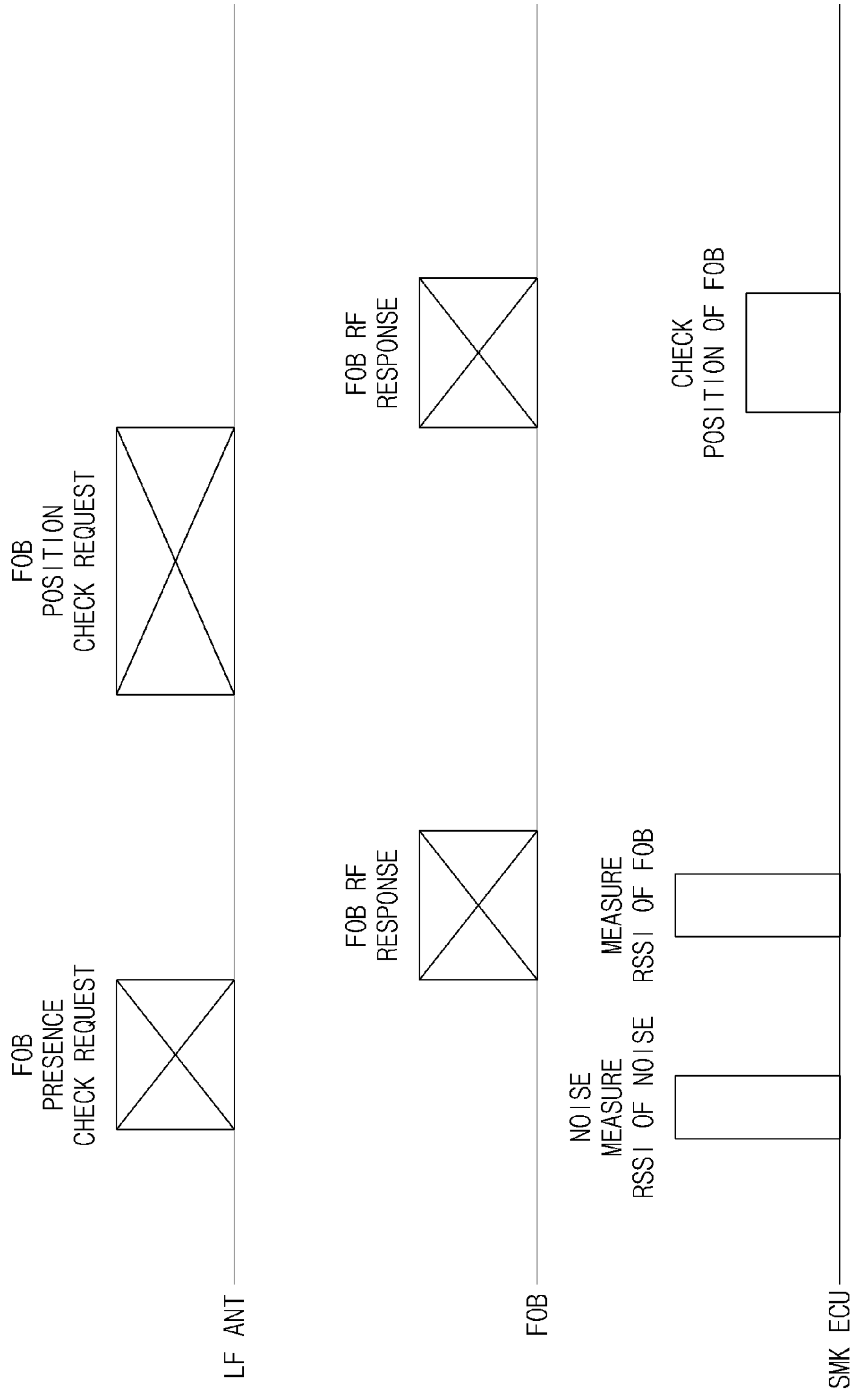
FIG. 3 is a diagram for describing an intensity of RF noise being reflected in the determination reference of FIG. 2.

Hereinafter, embodiments of the present invention will be described in detail with reference to FIGS. 1 to 3. FIG. 1 is a diagram for describing a smartkey system according to an embodiment of the present invention. FIG. 2 is a diagram for describing a determination reference based on a measured RSSI value. FIG. 3 is a diagram for describing an intensity of RF noise being reflected in the determination reference of FIG. 2.

As illustrated in FIG. 1, the smartkey system according to an embodiment of the present invention includes a smartkey electronic control unit (SMK ECU) 110 and a fob 120.

When a door handle button is manipulated by a user or is operated by a start switch button (SSB) and thus a command for searching for a fob registered in a vehicle is received, the SMK ECU 110 transmits a presence check request signal, and when the presence check request signal is received from the SMK ECU 110, the fob 120 transmits a presence check response signal in response to the received signal.

When the presence check response signal is received from the fob 120, the SMK ECU 110 transmits a position check request signal, and when the position check request signal is received from the SMK ECU 110, the fob 120 transmits a position check response signal in response to the received signal.

When the position check response signal is received from the fob 120, the SMK ECU 110 determines whether the fob 120 is located inside or outside a vehicle, and opens a vehicle door or starts the vehicle according to the determination result.

To describe the above-described details in more detail, when the door handle button or the SSB is manipulated by a user of the vehicle, the SMK ECU 110 checks the presence of the fob 120 and a position of the fob 120 to open the vehicle door or start the vehicle.

For example, when the door handle button or the SSB is manipulated by the user inside the vehicle, the SMK ECU 110 transmits the presence check request signal to the fob 120, and when the presence check response signal is received from the fob 120 in response to the transmitted signal, the SMK ECU 110 determines there to be the fob 120. When it is determined that there is the fob 120, the SMK ECU 110 transmits the position check request signal to the fob 120, and when the position check response signal is received from the fob 120 in response to the transmitted signal, the SMK ECU 110 checks the position of the fob 120 on the basis of the received signal. When it is determined that the fob 120 is located outside (i.e., outdoor) the vehicle, the SMK ECU 110 opens the vehicle door, and when it is determined that the fob 120 is located inside the vehicle, the SMK ECU 110 starts the vehicle.

In order to check the presence of the registered fob 120, the smartkey system drives only a designated low frequency (LF) antenna, the fob 120 registered in the vehicle transmits only an RF signal, and an RF receiving module of the smartkey system measures only an intensity of the RF signal received from the fob 120. In order to check the position of the fob 120, the smartkey system drives all LF antennas, the fob 120 transmits an RF signal including position data, and the RF receiving module of the smartkey system analyzes data received from the fob 120 to transfer the analysis result to the SMK ECU 110.

As described above, an operation of checking the smartkey system expends more time than a presence checking operation.

To describe features of the present invention compared to the related art, the SMK ECU 110 measures an RSSI value of an RF signal received from the fob 120, and when the measured RSSI value is equal to or greater than a predetermined reference value as illustrated in FIG. 2, the SMK ECU 110 determines there to be the fob 120, and performs the position checking operation (which is a next stage) for the fob 120.

That is, the present invention corrects a reference value used to determine the presence of a registered fob, on the basis of the presence check response signal received from the fob.

For example, the present invention prevents an error of fob recognition under a related art RF noise environment, and as illustrated in FIG. 3, the SMK ECU 110 measures an RSSI value of RF noise at a time (a timing for requesting the presence check of a fob) when the presence check request signal is transmitted to the fob 120 through the LF antenna.

In a case where the measured RSSI value of the RF noise is less than a reference level value used to determine the presence of a fob, when a response signal is received from the fob 120 in response to the presence check request signal [a response timing of the fob 120], the SMK ECU 110 measures an RSSI value of the received response signal. Only when the measured RSSI value of the RF noise is equal to or greater than the reference level value, the SMK ECU 110 determines there to be the fob 120 registered in the vehicle.

Moreover, when the measured RSSI value of the RF noise is greater than the reference level value used to determine the presence of a fob, the SMK ECU 110 stores the measured RSSI value of the RF noise, measures the RSSI value of the response signal received from the fob 120 at the response timing of the fob 120, and compares the stored RSSI value and the measured RSSI value. When the RSSI value of the received response signal is less than the RSSI value of the RF noise, the SMK ECU 110 determines there to be no fob 120, and when the RSSI value of the received response signal is greater than the RSSI value of the RF noise, the SMK ECU 110 determines there to be no fob 120. When it is determined that there is the fob 120, the SMK ECU 110 performs the position check requesting operation of the fob 120.

In the smartkey system, the RF receiving module may receive data from the fob 120 only when an RF signal intensity of the fob 120 is greater than an intensity of RF noise.

For example, only when a signal output intensity of the fob 120 is greater than an intensity of a noise signal, the SMK ECU 110 may normally receive data from the fob 120. That is, in all smartkey systems, when an intensity of noise is greater than the signal output intensity of the fob 120, the RF receiving module cannot receive data from the fob 120, and for this reason, it is unable to normally operate the SMK ECU 110.

As described above, when checking only an RSSI value of a signal received from the fob 120 in a zone having strong noise, due to the strong noise, the SMK ECU 110 determines there to be the fob 120 despite there being no fob 120. To solve such a problem, the present invention reflects a measured intensity of noise to determine the presence of a fob, and thus can prevent an error in which the SMK ECU 110 determines there to be a fob due to severe noise despite there being no fob, and checks a position of the fob.

Figure 4A:
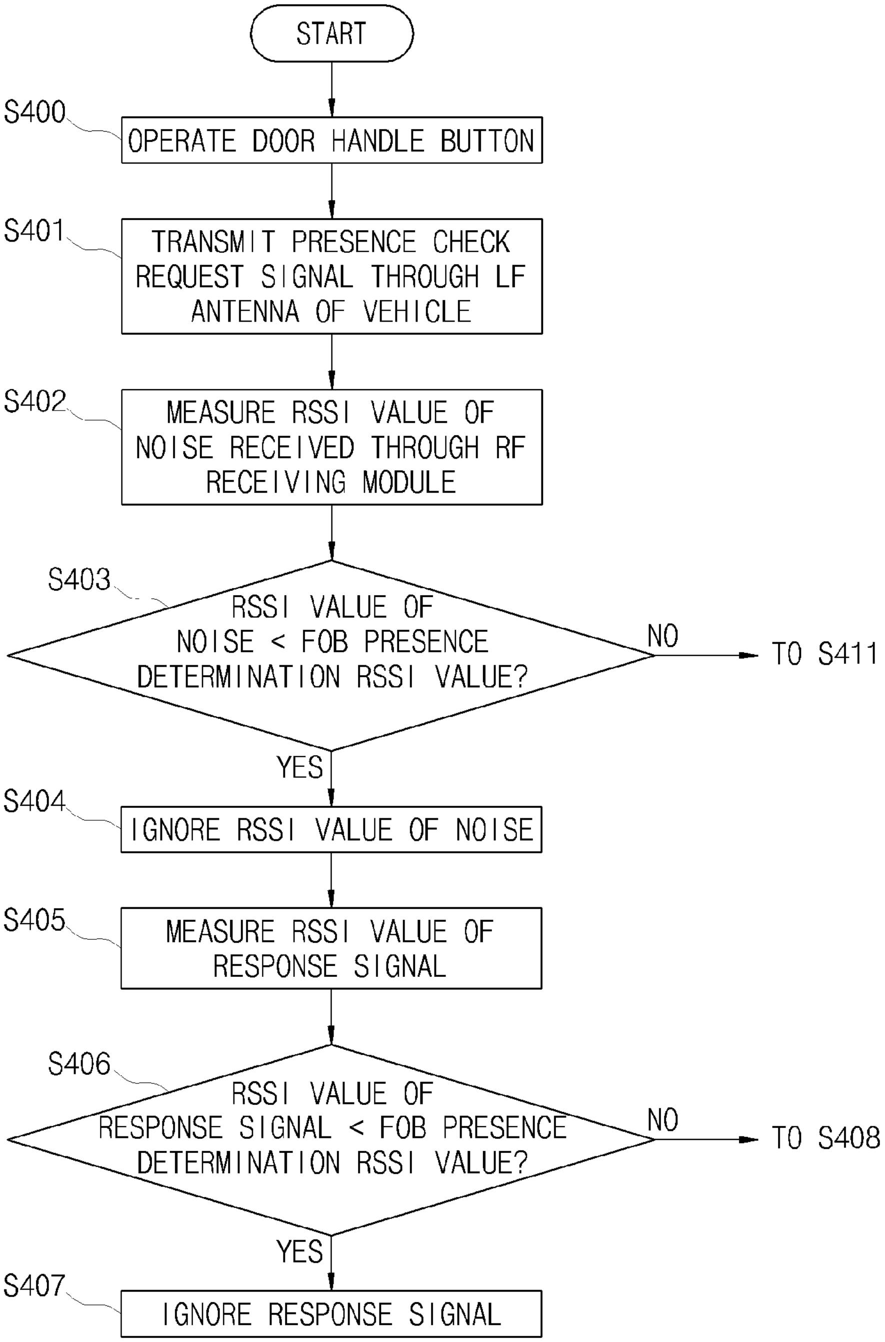
FIG. 4A to 4C are a flowchart for describing a method of operating a smartkey system according to an embodiment of the present invention.
Figure 4B:
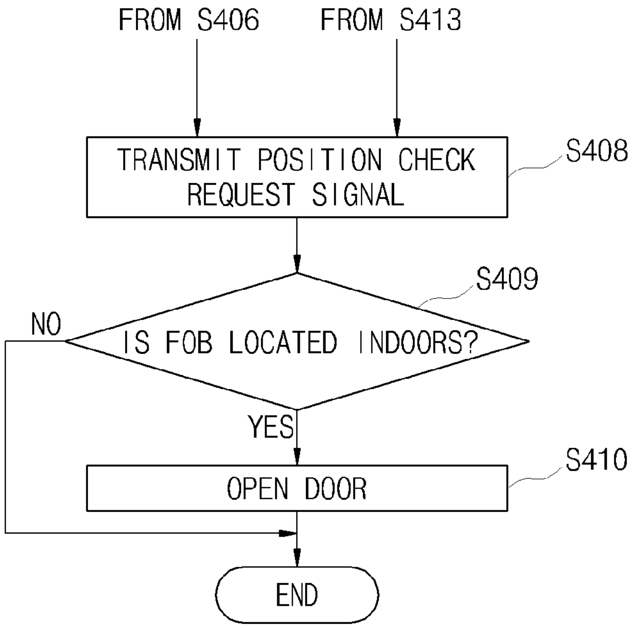
Figure 4C:
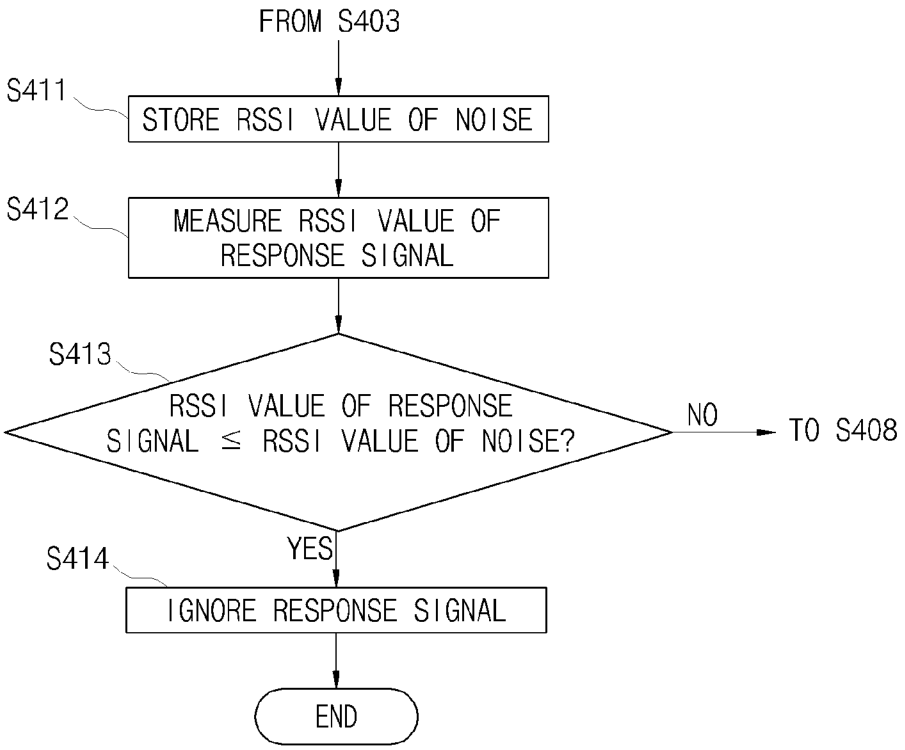

Hereinabove, the smartkey system according to an embodiment of the present invention has been described with reference to FIGS. 1 to 3. Hereinafter, a method of operating a smartkey system according to an embodiment of the present invention will be described with reference to FIG. 4A to 4C. FIG. 4A to 4C are a flowchart for describing a method of operating a smartkey system according to an embodiment of the present invention.

As illustrated in FIG. 4A to 4C, the door handle button is manipulated by the user in operation S400. When the door handle button is manipulated, the SMK ECU 110 transmits the presence check request signal, used to check the presence of the fob 120, through the LF antenna equipped in the vehicle in operation S401, and measures an RSSI value of RF noise received through the RF receiving module in operation S402.

The SMK ECU 110 compares the measured RSSI value of the RF noise and a predetermined fob presence determination RSSI value in operation S403, and when the predetermined fob presence determination RSSI value is greater than the measured RSSI value of the RF noise as the comparison result, the SMK ECU 110 ignores the measured RSSI value of the RF noise in operation S404. That is, the received RF noise is determined as not affecting a response signal which is to be received from the fob 120.

When a response signal is received through the RF receiving module from the fob 120 in response to the presence check request signal, the SMK ECU 110 measures an RSSI value of the received response signal in operation S405, and compares the measured RSSI value of the response signal and the predetermined fob presence determination RSSI value in operation S406. When the predetermined fob presence determination RSSI value is greater than the measured RSSI value of the response signal as the comparison result, the SMK ECU 110 ignores the response signal received from the fob 120 in operation S407. That is, the SMK ECU 110 determines there to be no fob.

However, when the measured RSSI value of the response signal is greater than the predetermined fob presence determination RSSI value as the comparison result, the SMK ECU 110 determines there to be the fob 120, and transmits the position check request signal used to check a position of the fob 120 in operation S408.

When a response signal is received from the fob 120 in response to the position check request signal, the SMK ECU 110 checks the position of the fob 120 on the basis of the received response signal in operation S409, and when it is checked that the fob 120 is located outside the vehicle, the SMK ECU 110 allows the vehicle door to be opened in operation S410.

However, when the measured RSSI value of the RF noise is greater than the predetermined fob presence determination RSSI value as the comparison result of operation S403, the SMK ECU 110 stores the RSSI value of the RF noise in operation S411, and when a response signal is received through the RF receiving module from the fob 120 in response to the presence check request signal, the SMK ECU 110 measures an RSSI value of the received response signal in operation S412, and compares the measured RSSI value of the received response signal and the stored RSSI value of the RF noise in operation S413.

When the stored RSSI value of the RF noise is greater than the measured RSSI value of the received response signal as the comparison result, the SMK ECU 110 ignores the response signal received from the fob 120 in operation S414. That is, the SMK ECU 110 determines there to be no fob.

On the other hand, when the measured RSSI value of the received response signal is greater than the stored RSSI value of the RF noise as the comparison result, the SMK ECU 110 performs operations S408 to S410.

As described above, the present invention can prevent a reaction slowdown, such as a door handle being opened after several seconds elapse from a time when a door handle button is manipulated, in a zone having strong RF noise.

In particular, the present invention can accurately determine whether there is a registered fob in a zone having strong RF noise, thus enabling an operation based on a user's request to be quickly performed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A smartkey system comprising:

a fob; and a smartkey electronic control unit (SMK ECU) configured to measure a received signal strength indicator (RSSI) value of radio frequency (RF) noise received through an RF communication module when transmitting a presence check request signal to the fob, check whether the measured RSSI value of the RF noise is less than a presence determination reference value used to determine presence of the fob, measure an RSSI value of a response signal received from the fob in response to the presence check request signal when the measured RSSI value of the RF noise is less than the presence determination reference value as the check result, and determine there to be the fob registered in a vehicle when the measured RSSI value of the response signal is equal to or greater than the presence determination reference value.

2. The smartkey system of claim 1, wherein when the measured RSSI value of the RF noise is equal to or greater than the presence determination reference value as the check result, the SMK ECU stores the measured RSSI value of the RF noise, measures an RSSI value of a response signal received from the fob, compares the stored RSSI value of the RF noise and the measured RSSI value of the response signal, and determines whether there is the fob according to the comparison result.

3. The smartkey system of claim 2, wherein, when the measured RSSI value of the response signal is less than the stored RSSI value of the RF noise as the comparison result, the SMK ECU determines there to be no fob, and when the measured RSSI value of the response signal is equal to or greater than the stored RSSI value of the RF noise as the comparison result, the SMK ECU determines there to be the fob.

4. The smartkey system of claim 1, wherein, when it is determined that there is the fob, the SMK ECU transmits a position check request signal to the fob, and when a response signal is received from the fob in response to the position check request signal, the SMK ECU determines whether the fob is inside or outside the vehicle, based on the received response signal.

5. The smartkey system of claim 4, wherein, when a door handle button or a start switch button is manipulated, the SMK ECU transmits the presence check request signal to the fob, when it is determined that the fob is outside the vehicle, the SMK ECU opens a vehicle door, and when it is determined that the fob is inside the vehicle, the SMK ECU starts the vehicle.

6. The smartkey system of claim 1, wherein, when it is determined that there is the fob, the SMK ECU drives only a specific low frequency (LF) antenna that is designated among a plurality of LF antennas equipped in the vehicle, and when a position of the fob is checked, the SMK ECU drives all the plurality of LF antennas equipped in the vehicle.

7. The smartkey system of claim 1, wherein, when the presence check request signal is transmitted and then a specific signal is received out of a predetermined response time in response to the presence check request signal, the SMK ECU recognizes the received specific signal as the RF noise, and when the specific signal is received within the predetermined response time in response to the presence check request signal, the SMK ECU recognizes the received specific signal as a response signal responding to the presence check request signal.

8. A method of operating a smartkey system, the method comprising:

measuring a received signal strength indicator (RSSI) value of radio frequency (RF) noise received through an RF communication module when transmitting a presence check request signal to a fob;

checking whether the measured RSSI value of the RF noise is less than a presence determination reference value used to determine presence of the fob;

measuring an RSSI value of a response signal received from the fob in response to the presence check request signal when the measured RSSI value of the RF noise is less than the presence determination reference value as the check result; and determining there to be the fob registered in a vehicle when the measured RSSI value of the response signal is equal to or greater than the presence determination reference value.

9. The method of claim 8, further comprising:

when the measured RSSI value of the RF noise is equal to or greater than the presence determination reference value as the check result, storing the measured RSSI value of the RF noise, and measuring an RSSI value of a response signal received from the fob; and comparing the stored RSSI value of the RF noise and the measured RSSI value of the response signal to determine whether there is the fob according to the comparison result.

10. The method of claim 9, wherein the determining of whether there is the fob comprises:

when the measured RSSI value of the response signal is less than the stored RSSI value of the RF noise as the comparison result, determining there to be no fob; and when the measured RSSI value of the response signal is equal to or greater than the stored RSSI value of the RF noise as the comparison result, determining there to be the fob.

11. The method of claim 9, further comprising:

when it is determined that there is the fob, transmitting a position check request signal to the fob; and when a response signal is received from the fob in response to the position check request signal, determining whether the fob is inside or outside the vehicle, based on the received response signal.

12. The method of claim 11, wherein the measuring of an RSSI value of RF noise comprises, when a door handle button or a start switch button is manipulated, transmitting the presence check request signal to the fob.

13. The method of claim 11, wherein the transmitting of a position check request signal comprises driving all low frequency (LF) antennas equipped in the vehicle.

14. The method of claim 8, wherein the measuring of an RSSI value of RF noise comprises driving only a specific low frequency (LF) antenna that is designated among a plurality of LF antennas equipped in the vehicle.

15. The method of claim 8, wherein the measuring of an RSSI value of RF noise comprises:

determining whether a specific signal is received out of a predetermined response time in response to the presence check request signal after the presence check request signal is transmitted; and when it is determined that the specific signal is received out of the predetermined response time in response to the presence check request signal, recognizing the received specific signal as the RF noise.

16. The method of claim 15, wherein the measuring of an RSSI value of a response signal comprises, when it is determined that the specific signal is received within the predetermined response time in response to the presence check request signal, recognizing the received specific signal as a response signal responding to the presence check request signal.

* * * * *